Aug. 3, 1937.　　　　　H. D. GEYER　　　　　2,088,739
RUNNING BOARD AND RUBBER MAT THEREFOR

Filed Feb. 18, 1935

INVENTOR
Harvey D. Geyer
BY
Spencer Hardman & Fehr
HIS ATTORNEYS

Patented Aug. 3, 1937

2,088,739

UNITED STATES PATENT OFFICE 2,088,739

RUNNING BOARD AND RUBBER MAT THEREFOR

Harvey D. Geyer, Dayton, Ohio, assignor to General Motors Corporation, Detroit, Mich., a corporation of Delaware Application February 18, 1935, Serial No. 6,938

2 Claims. (Cl. 280—169)

This invention relates to automobile running boards or other metal surfaces having a separately made resilient rubber covering applied to the surface thereof.

Pressed metal running boards having a resilient rubber mat bonded by vulcanization in situ to the metal step surface thereof are now well-known and in common use. In such constructions the rubber mat is very strongly fixed to the metal surface and the vulcanized bond between the metal and rubber prevents seepage of water between the two and consequent rusting or corrosion. However such running boards are quite costly to make since the metal board must be used as an insert in the vulcanizing mold when the rubber covering is vulcanized in place thereupon. This necessitates large and costly vulcanizing molds for each particular design of running board, and of course necessitates the handling of the relatively heavy board throughout the operations of applying the vulcanized rubber covering thereto. Usually the steel running board is made at one factory and the rubber covering is applied at a rubber factory located some distance away, and hence the above method involves quite costly shipment or other movement of the relatively heavy metal boards to and from the point where the rubber covering is vulcanized thereupon.

Now the object of this invention is to provide a resilient rubber mat which is molded separately and apart from the metal board, but which is provided with means for subsequently very simply and efficiently attaching same to the metal surface of the running board so that it will readily conform to the surface thereof and be strongly retained thereupon. A great saving in cost is obtained since the rubber mat may be molded in flat or other desired form and then flexed to conform exactly to the curved metal surface upon which it may be subsequently applied and securely fixed by the means of this invention. It is obvious that a great saving in mold costs will be had by the use of this invention since the same mold may be used to make flexible rubber mats for more than one design of metal running board, simply by properly locating the holes in the different designs of metal boards.

A more specific object of this invention is to provide a separately molded resilient rubber covering having a series of spaced apart integral resilient rubber lugs projecting from the back surface thereof and adapted to be pressed with a snug fit through corresponding holes in a metal surface and serve to retain said covering upon said metal surface in a closely adhering relation.

Further objects and advantages of the present invention will be apparent from the following description, reference being had to the accompanying drawing, wherein a preferred embodiment of the present invention is clearly shown.

Figure 1:
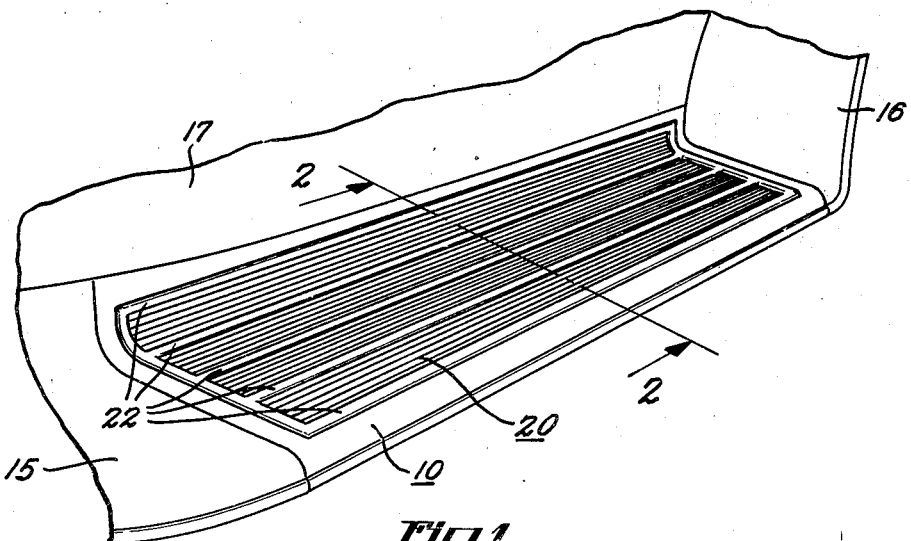
Fig. 1 is a perspective view of an automobile metal running board and adjacent parts, the metal board having both its flat and curved surfaces covered by the resilient rubber mat of this invention.

The pressed sheet metal running board shown for the purpose of illustrating this invention is designated as a whole by 10. This metal board 10 has a flat step portion 11, a downwardly curved outer marginal portion 12 and an upwardly curved inner marginal portion 13. Obviously the board 10 may also have a longitudinal curvature if so desired, that is, its end portions may curve upwardly to meet the front fender 15 and rear fender 16. 14 is the horizontal attachment flange by means of which the inner raised margin of the board is attached to the body sill adjacent the lower edges of the side body panels 17.

20 designates the separately-molded resilient rubber covering which is fixed to the upper exposed surface of the board 10 and forms a convenient and decorative step surface thereupon. This rubber mat 20 is preferably originally molded in flat form and has a series of integrally molded resilient rubber lugs 21 projecting from its back surface. Preferably mat 20 is molded with a series of spaced longitudinal thicker portions or tread strips 22 for the purpose of reinforcement and strengthening the mat as a whole, particularly at its marginal edges, and yet at the same time permit easy transverse flexing of the mat between said longitudinal strips 22 so that it may be made to readily and accurately conform to the transverse curvature of the metal board 10. The thicker tread strips 22 also provide a stronger base or support for the rubber lugs 21 projecting from the opposite side of the mat 20. A series of holes 25 are provided in the metal board 10 and properly located to receive the lugs 21.

Figure 2:
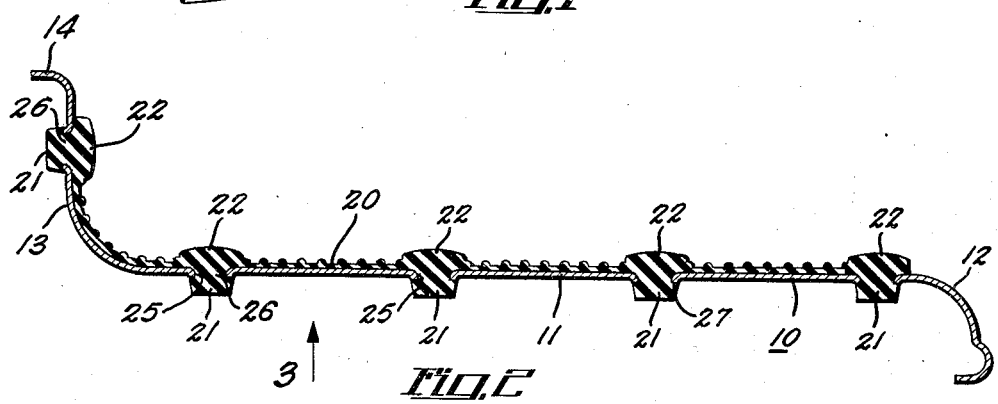
Fig. 2 is a section on line 2—2 of Fig. 1.
Figure 3:
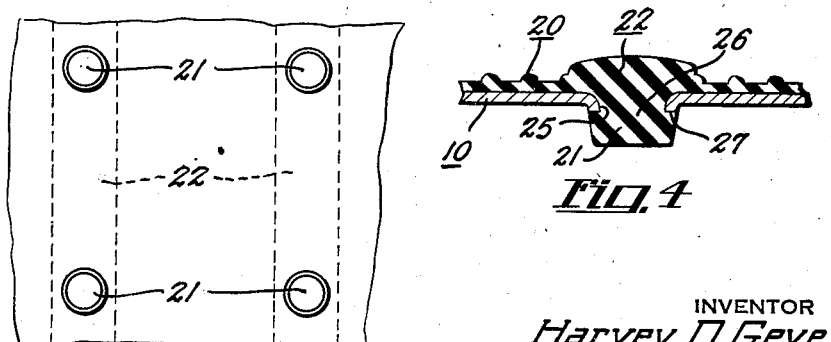
Fig. 3 is a bottom view on an enlarged scale, looking in the direction of arrow 3 of Fig. 2.
Figure 4:
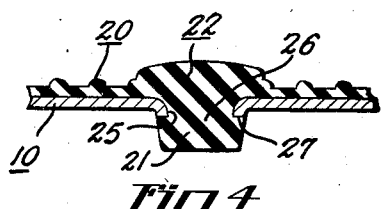
Fig. 4 is an enlarged vertical section through one of the attachment rubber lugs shown in Fig. 2.

These rubber lugs 21 are slightly larger than the holes 25 and are preferably provided with a slightly tapered outer surface so that they may be more easily pressed through the holes 25 until their narrowed neck portions 26 snap into the holes 25. Preferably lugs 21 are molded with quite abrupt shoulders 27 so located as to engage snugly under the metal around the holes 25 and thus serve to retain the rubber covering 20 in tight engagement with the opposite surface of the metal board 10. Any suitable spacing of the lugs 21 may be readily provided to give the desired strong attachment of the rubber mat to the board. Preferably a row of lugs 21 is provided all around the marginal edges of the mat 20 to more securely retain these edges against being pulled or knocked up by accident or otherwise. Also preferably a row of lugs 21 is provided along both longitudinal margins of the curved portion 13 of the board (as shown in Fig. 2) in order to more securely hold the rubber mat against buckling away from the metal at this curved portion. Preferably the holes 25 are extended, that is they have small downwardly turned inwardly tapered lips, as clearly shown in the drawing, since this feature facilitates the work of pressing the lugs 21 into the holes 25 and also makes it much harder for the lugs 21 to be pushed or pulled out of the holes.

In case the rubber mat wears out or needs replacement for any reason, the old mat may be pulled off by exerting a sufficient pulling effort on the strips 22 to pull the lugs 21 out of their holes 25 or possibly by shearing them off, and a new mat applied to the metal board simply by pressing the new lugs into these holes, all without detaching the metal board from the car.

While the embodiment of the present invention as herein disclosed, constitutes a preferred form, it is to be understood that other forms might be adopted, all coming within the scope of the claims which follow.

What is claimed is as follows:

1. In combination, a sheet metal running board having a longitudinally extending upwardly concave curved surface and having two rows of holes spaced apart substantially along opposed margins of said curved surface, and a separately-molded resilient rubber mat molded in the flat and applied to said curved surface and flexed in a transverse direction into substantial conformity therewith, said mat having two spaced longitudinally extending stiffening ribs overlying said two rows of holes respectively and having integral rubber lugs projecting from the back surface of said stiffening ribs and extending through said holes in the metal board with a snug fit and serving to retain said mat to said metal board along the opposed margins of said curved surface.

2. In combination, a metal running board having a longitudinally extending transversely curved surface and having a series of small holes extending along opposed margins of said curved surface, and a flat-molded resilient rubber mat secured to said board and having a series of transversely-spaced longitudinally-extending rubber stiffening ribs which render said mat materially stiffer against longitudinal bending than against transverse bending, said mat being readily flexed in a transverse direction to conform to and lie closely upon said transversely curved surface of said metal board, said stiffening ribs having a series of integral shouldered lugs projecting directly from the back surface thereof and extending thru said holes in said board and serving to retain said mat thereupon.

HARVEY D. GEYER.